United States Patent [19]

Topmiller

[11] Patent Number: 5,210,698
[45] Date of Patent: May 11, 1993

[54] SERVO CONTROL FOR MOLDING MACHINE

[75] Inventor: David A. Topmiller, Ft. Wright, Ky.

[73] Assignee: Cincinnati Milacron Inc., Cincinnati, Ohio

[21] Appl. No.: 643,977

[22] Filed: Jan. 18, 1991

[51] Int. Cl.$^5$ ............................................. G06F 15/46
[52] U.S. Cl. .................................. 364/476; 364/178; 364/143
[58] Field of Search ............... 364/476, 178, 179, 162, 364/140, 141, 142, 143, 180, 199; 251/129.01, 129.04, 129.15

[56] References Cited

U.S. PATENT DOCUMENTS

| | | | |
|---|---|---|---|
| 3,920,965 | 11/1975 | Sohrwardy | 365/149 |
| 4,635,182 | 1/1987 | Hintz | 364/179 |
| 4,695,237 | 9/1987 | Inaba | 364/476 |
| 4,745,541 | 5/1988 | Vaniglia et al. | 364/141 |
| 4,821,167 | 4/1989 | Wiebe | 364/179 |
| 4,981,173 | 1/1991 | Perkins et al. | 251/129.15 |
| 5,062,052 | 10/1991 | Sparer et al. | 364/476 |
| 5,062,053 | 10/1991 | Shirai et al. | 364/476 |
| 5,068,779 | 11/1991 | Sullivan et al. | 364/476 |

OTHER PUBLICATIONS

Product Bulletin BTS 412A, Siemens Components, Inc., Oct., 1987 pp. 17-22.
Product Bulletin BTS 412B, Siemens, AKT., Sep., 1989, pp. 1-7.
Product Summary BTS 412A, Siemens, Oct., 1988.
Product Summary BTS 412B, Siemens, Oct., 1988.
Electronic Design, Jan. 26, 1989, "Inhibit Short-Circuit Currents With Power MOSFET IC", pp. 148-149.

*Primary Examiner*—Jerry Smith
*Assistant Examiner*—Jim Trammell
*Attorney, Agent, or Firm*—John W. Gregg

[57] ABSTRACT

A method and apparatus are provided for servo control of injection molding machine devices. A signal processor periodically produces analogue control signals for controlling machine mechanisms at a first loop closure interval and periodically produces digital control signals for controlling energization of machine heaters at a second loop closure interval. Values of analogue and digital control signals are determined according to control algorithms relating set point values and measured parameter values. Calculation of values of analogue control signals includes calculation of a first command value according to a first control algorithm, calculation of a second command value according to a second control algorithm and selection of the lesser of the first and second command values. Compensation for "cold" thermocouple junctions created at the connection of remote temperature sensing thermocouple leads and the signal processor interface circuits is provided. DC output interface circuits including two stage over-current protection are provided.

29 Claims, 7 Drawing Sheets

SERVO CONTROL FOR MOLDING MACHINE

BACKGROUND OF THE INVENTION

I. Field of the Invention

This invention relates generally to control of molding machinery. In particular this invention relates to servo control of injection molding machine devices.

II. Description of the Prior Art

It is known to provide servo control for injection molding machine mechanisms including. Or example, a clamp for operating mating die components defining a mold cavity, an extruder for plasticizing material to be formed into a molded article an injection ram for effecting injection of the plasticized material into the mold cavity, and an ejector for removing the finished article from the mold cavity. In machines wherein the actuators are hydraulically operated, such servomechanism control is effected through electrically operated hydraulic valves controlling hydraulic cylinders and motors. It is also known to provide servo control of injection molding machine heaters to control the temperature of the material to be injection molded From U.S. Pat. No. 4.745.541 it is known to provide digital devices to effect servo control of molding machine mechanisms wherein the control algorithms are implemented by execution of programs by, for example, a microprocessor. The control algorithms are defined as mathematical relationships of measured parameters and control signals, the relationships including proportional, integral and derivative (PID) components. It is known from this reference to perform algorithm processing upon occurrence of a timed interrupt and to select an algorithm to be processed from a plurality of active control algorithms, While overcoming the inherent disadvantages of analogue control implementations, the control of this reference suffered the disadvantage that only a single loop closure interval was provided by the analogue signal processor. The control processor of this reference was not, therefore suitable for performing servo control of both machine mechanisms and heaters. Further, the servo control of this reference did not provide for control of a single analogue output in response to more than a single PID algorithm at any time. Consequently, the control signal was not effective to perform for example hydraulic pressure relief while implementing velocity control.

SUMMARY OF THE INVENTION

It is an object of the present invention to provide servo control of injection molding machine mechanisms and heaters by means of a single signal processing module providing first and second loop closure intervals.

It is a further object of the present invention to provide servo control of injection molding machine mechanisms wherein loop control of machine mechanisms is performed digitally at a first loop closure interval by a signal processing module and servo control of injection molding machine heaters is performed at a second loop closure interval by the same signal processing module.

It is a still further object of the present invention to provide servo control of injection molding machine heaters wherein cold junction compensation for thermocouple junctions is performed by the signal processing module.

It is a still further object of the present invention to provide servo control of injection molding machine heaters wherein output signal interfaces are provided with over-current protection circuits incorporating latching current limit circuitry responsive to the duration of current limiting.

It is a still further object of the present invention to provide servo control of a single controlled device in response to a control signal produced by selection of the lesser of two control values defining desired conditions simultaneously affected by operation of the controlled device.

In accordance with the aforesaid objects a servo control for an injection molding machine is provided having a digital signal processor for executing control algorithms at first and second predetermined loop closure intervals. Analogue control algorithms are processed at a first loop closure interval to produce analogue output signals for control of, for example, mechanism controlling valves. A single analogue output may be controlled in response to the lesser of control values determined in response to two control algorithms relating conditions of the machine simultaneously affected by operation of the controlled device. Temperature control algorithms are processed at a second loop closure interval to provide control signals for controlling application of power to, for example, heater bands applied to a barrel segment of the injection molding machine extruder. The signal processor module uses a commercially available digital signal processor to execute servo control algorithms. In one alternative embodiment, algorithms are provided for performing position control and current control in association with servo control of valves. The signal processor module is provided with a temperature sensor to permit compensation of apparent measured temperature produced by thermocouples interfaced to the signal processor module. Binary device interface circuits are provided for controlling, for example, application of power to the extruder heater bands. These interface circuits include over-current protection including current limiting and latched fault control responsive to detection of current limiting for a predetermined period.

Further objects and advantages of the present invention shall become apparent from the attached drawings and the description thereof.

DETAILED DESCRIPTION OF THE PREFERRED EMBODIMENT

To illustrate the present invention, an injection molding machine servo control developed by Cincinnati Milacron Inc., the assignee of the present invention, shall be described in detail. While this control constitutes a preferred embodiment of the invention,it is not the intention of applicant to limit the scope of the invention to the particular details of this control. Rather, it is the intention of the applicant that the invention be defined by the claims appended hereto and all equivalents thereof.

Injection Molding Machine

Figure 1:
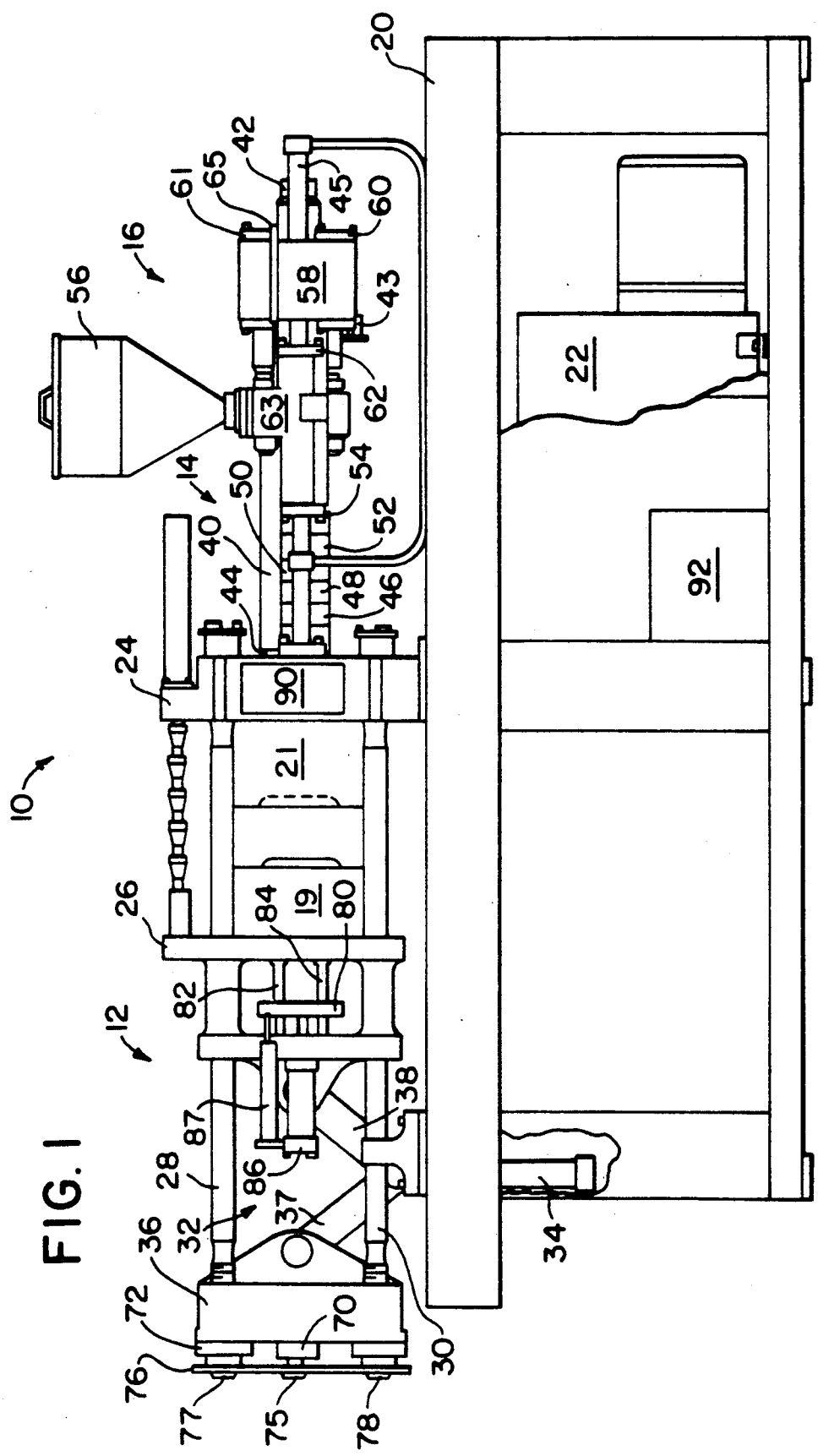
FIG. 1 is side view of an injection molding machine.

FIG. 1 is a side view of an injection molding machine 10 including a clamp mechanism 12, an extruder 14, an injection unit 16, and an ejector 18. Molded articles are formed of a plasticized material injected into a mold cavity formed by mating die components 19 and 21 cooperatively operated by clamp mechanism 12. Each of the machine mechanisms may be operated by hydraulic actuators or the like supplied with pressurized hydraulic fluid from a pump and tank unit 22 mounted within machine frame 20.

Continuing with reference to FIG. 1, clamp mechanism 12 includes a fixed platen 24' fixedly mounted to machine frame 20 and a movable platen 26 slidably mounted on four tie bars including bars 28 and 30 shown in FIG. 1. Reciprocation of movable platen 26 is effected by a toggle mechanism 32 operated by hydraulic cylinder 34. Toggle mechanism 32 imparts a force on movable platen 26 by a series of toggle linkages including links 37 and 38 shown in FIG. 1, pivoting relative to fixed die height platen 36. When links 37 and 38 are aligned parallel to the machine frame, the toggle mechanism is mechanically locked against reaction forces acting on movable platen 26 as a result of injection of material into the mold cavity. Reciprocation of movable platen 26 opens and closes a mold cavity defined by mating die components 19 and 21.

Extruder 14 plasticizes material to be injection molded by a combination of heating and material working as is well known. Extruder 14 includes a barrel segment 40 having a longitudinal bore therethrough containing a plasticizing screw (not shown) rotated by extruder motor 42. As the screw is rotated the material is worked resulting in material self heating. External heater bands 46 through 54 are affixed to the exterior of barrel segment 40 to assist in controlling the temperature of the plasticized material within extruder 14. Material to be plasticized is loaded into extruder 14 via hopper 56. A nozzle 44 is fitted to barrel segment 40 at the exit end thereof. Nozzle 44 includes a nozzle tip for insertion into a communicating passage in fixed platen 24 providing a path for injection of plasticized material into the mold cavity. Nozzle 44 is equipped with a shut-off valve for controlling the emission of plasticized material from barrel 40.

To effect injection of plasticized material into the mold cavity, the extruder screw is advanced longitudinally within barrel 40 in the direction of fixed platen 24. A predefined volume of plasticized material is thereby forced into the mold cavity. Reciprocation of the extruder screw is effected by longitudinal movement of injection unit ram 58, to which extruder motor 42 is mounted, relative to pull-in unit 63, to which barrel segment 40 is mounted. Both injection unit ram 58 and pull-in unit 63 are slidably supported by a pair of opposed injection unit guide rods mounted to fixed platen 24 including injection unit guide rod 45 shown in FIG. 1. Movement of injection unit ram 58 is accomplished by a pair of hydraulic cylinders 60 and 61 having pistons fixed to pull-in unit 63. Reciprocation of the entire injection unit 16 is accomplished by a pair of opposed pull-in unit hydraulic cylinders fixed to pull-in unit 63, including cylinder 62 shown in FIG. 1. Pistons of the pull-in unit hydraulic cylinders are fixed to the injection unit guide rods. Retraction of the injection unit permits retraction of the extruder nozzle from the fixed platen to effect breakage of sprue at the passage in fixed platen 24 and to permit changing of nozzle 44.

A portion of the gap between fixed platen 24 and movable platen 26, known as die height, may be adjusted to accommodate thickness of mold components 19 and 21. Die height is adjusted by rotating tie bar nuts threaded to the tie bar ends projecting through die height platen 36, including nuts 72 and 74 shown in FIG. 1. The resulting translation of die height platen 36 alters the location of clamp mechanism 12, including movable platen 26, relative to fixed platen 24. Rotation of tie bar nuts is effected by drive motor 70 through a sprocket 75 engaging chain 76 wrapped around nut sprockets including sprockets 77 and 78.

To insure removal of finished articles from the mold cavity, ejector 18 is mounted to movable platen 26. Ejector plate 80 is slidably mounted on guide rods including rods 82 and 84 shown in FIG. 1 and reciprocated by a pair of ejector hydraulic cylinders including cylinder 86. Ejector push rods (not shown) are affixed to ejector plate 80 and operate through passages in movable platen 26 to cooperate with ejector pins assembled in die component 19.

An operator station 90 including a keyboard and display is mounted to fixed platen 24. Operator station 90 permits an operator to intervene in operation of the machine and monitor machine performance. Operation of the machine is controlled by programs executed by a machine control 98 contained in cabinet 92 located in frame 20. Data used in the execution of the programs, including set point values for controlling the operation of the machine mechanism actuators and the heaters, may be entered via operator station 90.

Machine Control

Figure 2:
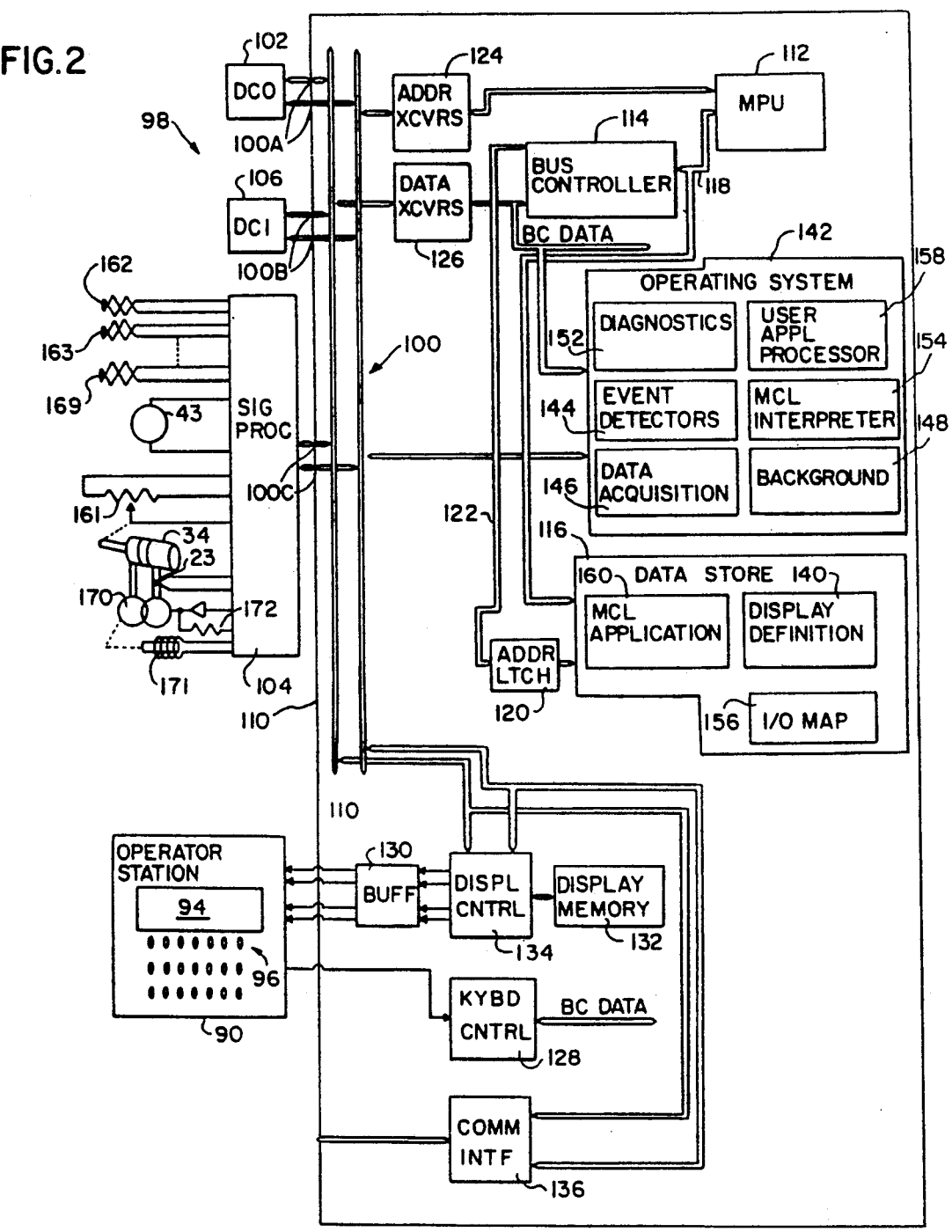
FIG. 2 is a block diagram of the machine control applied to the machine of FIG. 1.

A block diagram of the machine control shall be described with reference to FIG. 2. Control 98 includes a processor module 110 to which are connected interface modules such as, for example DC output interface module 102, DC input interface module 106, and signal processing module 104. Processor module 110 executes machine control application programs 160 which define a machine cycle of operation for production of molded articles. In addition, processor module 110 executes user application programs 140 to perform functions associated with selected peripheral devices such as creation of display data for display 94. Servo control of operation of the mechanism actuators and of the application of power to the extruder heaters is performed by signal processor module 104 in response to set point signals produced by processor module 110 by execution of application programs 160. Operation of devices associated with machine 10 which are controlled by binary control signals, i.e. ON/OFF signals, is effected through output interface modules such as, for example, DC output interface module 102. Monitoring of devices producing binary status signals is achieved through input interface modules such as for example, DC input interface module 106. Each of the modules 102, 104, and 106 are electrically connected to processor module 110 via connectors comprising mating plug and socket pairs such as pairs 100A, 100B, and 100C making up an expansion bus 100 over which are conducted data, address and bus control signals. Expansion bus 100 conforms to the Industry Standard Architecture bus definition and sufficient connector sockets are provided on processor module 110 to accept up to ten modules in expansion bus 100.

Machine control application programs 160 and user application programs 140 are stored in memory 116. These programs are executed by microprocessor 112 under control of operating system programs recorded in read-only-memory (ROM) 142. Applicant has chosen the 80386sx microprocessor available from Intel Corporation for microprocessor 112. Data is transferred between the internal data bus of microprocessor 112 and memory 116 directly over local data bus 118. Memory data addresses are transferred over memory address bus 122 and latched at address latch 120. Memory address bus 122 and data and address lines of the expansion bus are controlled by bus controller 114. All data exchanges between microprocessor 112 and expansion bus 100 are performed through bus controller 114. Applicant has selected the 82C386 SX bus controller available from Chips and Technologies. Inc, for bus controller 114. Bus controller 114 produces control signals for controlling the transfer of data over expansion bus 100, provides buffering of data bus signals produced by microprocessor 112, and incorporates: an interrupt controller; a real time clock generator; a direct memory access controller; a programmable interval timer; interface logic for an 80387sx numeric coprocessor; and interface logic for an 8042 keyboard controller.

Keyswitch signals produced by keyboard 96 are interfaced to processor module 110 by a serial link connected to keyboard controller 128. Applicant has chosen the 8242 programmable keyboard controller available from Intel Corporation as keyboard controller 128. This device receives keyboard data in serial form and makes the keyboard data available at an eight bit data bus tied to the bus controller. As keyboard characters are received, keyboard controller 128 produces a data available interrupt signal indicating keyswitch data is available for transfer. Applicants have provided for periodic verification of communication with keyboard controller 128 and operator station 90 by transmission of a predetermined character to keyboard controller 128 to be "echoed". Upon availability of the echo character for transfer, keyboard controller 128 generates a data available interrupt request. Keyboard controller 128 includes a parallel input bus connected to a jumper block (not shown) used in association with system installation and maintenance to provide input signals affecting execution of programs by microprocessor 112.

Display 94 is a back-lighted liquid crystal display organized as 320 rows and 200 columns of display elements. Display data is output by display controller 134 to the display 94 through data signal buffers 130. Applicant has selected the 82C426 LCD/CRT controller available from Chips and Technologies, Inc, as display controller 134. Display data defining the state of each element of display 94 is generated by execution of user application programs 140 The display data is copied into display memory 132 from the expansion bus data lines under control of display controller 134. Display data is transferred to display 94 four bits at a time over four parallel lines under control of display controller 134.

Data communication to external devices such as a programming unit (not shown) is achieved by communication interface 136 effecting transfer of data by, for example, serial communication. Applicant has chosen the 82C601 peripheral controller available from Chips and Technologies, Inc, as the communication interface 136. Communication interface 136 generates a data request interrupt request when data is to be transmitted to the connected device in response to the connected device being in a condition to receive data and a data available interrupt request in response to the availability of data received from the external device. Data are exchanged between communication interface 136 and bus controller 114 over the data lines of expansion bus 100.

As will be appreciated from the foregoing, data communication between microprocessor 112 and the other components of processor module 110 is effected over a combination of local data and address busses and the address and data busses of expansion bus 100. Microprocessor 112 includes a 24 bit address bus and a 16 bit data bus. The address bus of microprocessor 112 is buffered by address transceivers 124 to generate address signals for expansion bus 100. Bus controller 114 produces 8 bit memory addresses for address bus 122 from addresses received over the unbuffered address bus. A 16 bit data bus of bus controller 114 is buffered by data bus transceivers 126 to produce the data lines of expansion bus 100.

Operating system programs executed by microprocessor 112 include event detector programs 144, data acquisition programs 146, background programs 148, diagnostic programs 152, machine control interpreter programs 154 and user processor programs 158. Event detector programs 144 control continuous monitoring of selected signals and programmed responses to detection of predetermined (trigger) conditions of those signals. Data acquisition programs 146 control periodic sampling of selected input signals for use in performing process monitoring under control of the machine control application programs. Diagnostic programs provide power on diagnostics of control system components, initialization of selected data values and initiation of system program execution. Background programs 148 provide data interfaces for user application programs as well as management of real time clock data produced by bus controller 114.

Signal Processor Module

The signal processor module 104 providing servo-control shall be described with reference to FIG. 3. It will be recalled that signal processor module 104 is connected to processor module 110 by means of expansion bus 100. Data to be exchanged between signal processor 104 and processor module 110 are written to locations in a dual port memory 504. Address lines of expansion bus 100 are gated to dual port memory 504 via address multiplexer 508 controlled by select signals produced by bus arbitration circuitry 518. Data is transferred between dual port memory 504 and data lines of expansion bus 100 through data transceiver 510 having the direction of transfer therethrough controlled by bus arbitration circuitry 518.

To implement dual port memory 504, applicant has chosen to use conventional single address bus random access memory devices operating in conjunction with bus arbitration circuitry 518. The bus arbitration circuitry 518 is responsive to addresses appearing on the address lines of expansion bus 100 and control commands produced on signal processor module 104 to control address select inputs of address multiplexer 508. Data transfers through the dual port memory are organized as multiple word vectors exchanged under control of the machine control interpreter programs 154 executed by processor module 110.

Signal processor module 104 performs servo control by execution of servo control algorithms at predetermined loop closure intervals. The algorithms are translated into programs executed by a digital signal processor 506. Applicant has chosen the TMS 320E14 digital signal processor available from Texas. Instruments. Inc as digital signal processor 506. This device includes programmable read-only memory which applicant has chosen as a store for servo control algorithm routines. Data to be read from or written to dual port memory 504 by digital signal processor 506 are transferred through data transceiver 512 over local data bus 514. Digital signal processor 506 receives a clock input produced by oscillator 516 and derives therefrom timing signals defining a first loop closure interval of 500 microseconds and a second loop closure interval of 50 milliseconds.

Process parameters associated with the machine processes being controlled are measured to produce analogue signals representing measured values of the process parameters. Signal processing module 104 provides input interfaces for these analogue input signals, converts the analogue input signals to digital representations thereof and uses the digital representations in the execution of control algorithms by digital signal processor 506. As applied to injection molding machine 10, signal processing module 104 produces valve control signals and heater control signals by execution of control algorithms relating proportional, integral, and derivative (PID) terms of measured parameters and a suitable control parameter. In the case of valve control, valve spool position commands are produced in response to, for example, controlled device position or velocity as well as hydraulic pressures measured by potentiometers, tachogenerators, pressure transducers, and the like. For example, a position sensing rotary potentiometer 161 measuring toggle link position from which position of movable platen 26 is derived is shown in FIG. 2. Other position transducers include linear potentiometer 87 shown in FIG. 1 for measuring position of injector plate 80 and linear potentiometer 65 shown in FIG. 1 for measuring position of injection ram 58, Tachogenerator 43 is used to measure the angular velocity of the extruder screw. A pressure transducer 23 is shown in FIG. 2 monitoring hydraulic pressure at the output of proportional valve 170. In the case of heater control, heater power commands are produced in response to measured temperatures produced by, for example thermocouples and the like, such as thermocouples 162 through 169 shown in FIG. 2 and which may be located within barrel segment 40 proximate heater bands 46 through 54.

Figure 3:
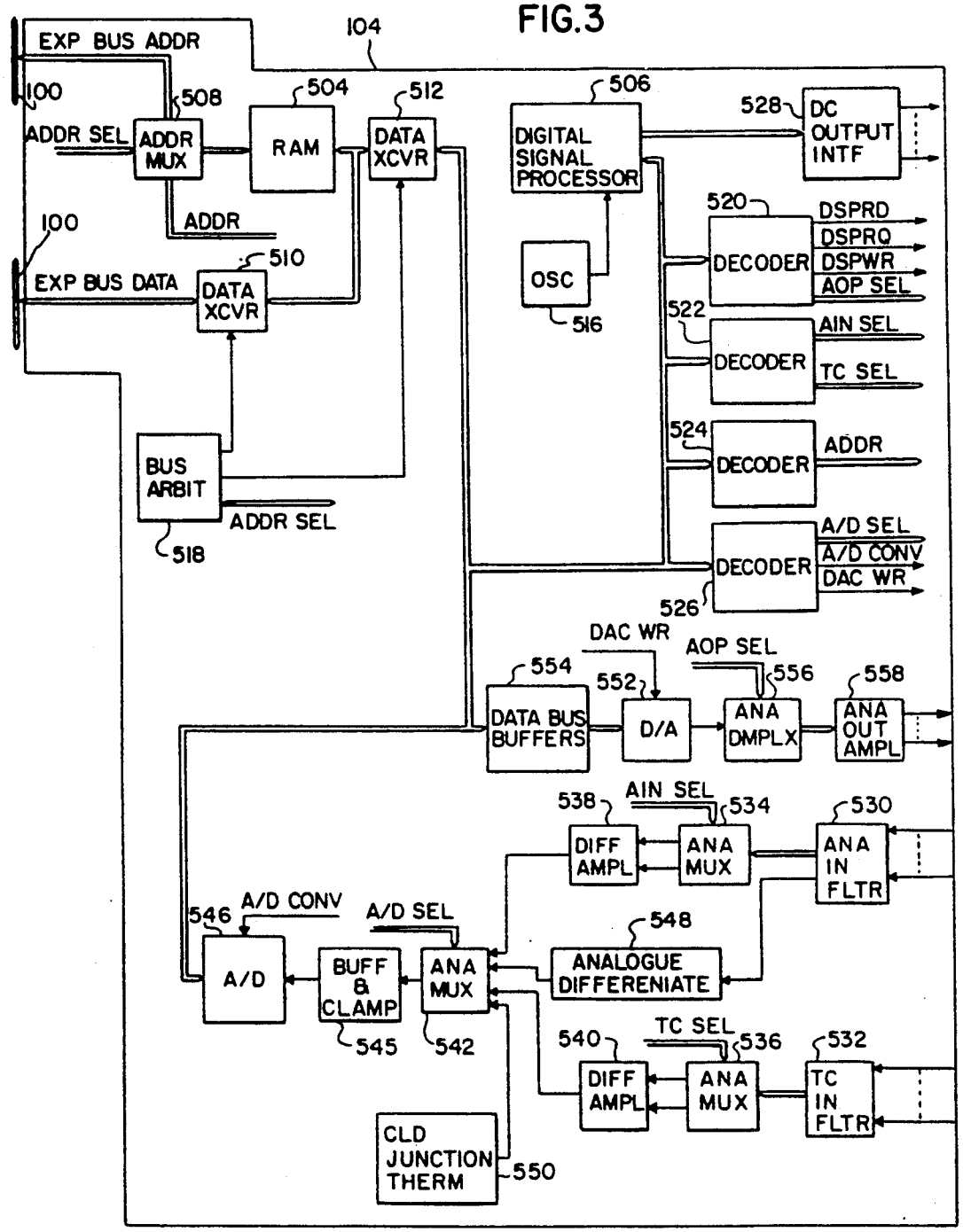
FIG. 3 is a block diagram of the servo control of the present invention.

Continuing with reference to FIG. 3, data bus outputs of digital signal processor 506 are decoded by decoders 520 through 526 to produce commands controlling devices used for input and output signal processing including: analogue input selection control signals AIN SEL; thermocouple input selection control signals, TC SEL; analogue-to-digital converter input selection signals A/D SEL; analogue to digital conversion control signals A/D CONV; digital to analogue converter write signals DACWR; and analogue output selection signals AOP SEL. In addition, the decoders produce address signals ADDR for data transfers through the dual port memory; and module read signals DSPRD, write signals DSPWR and data request signals DSPRQ.

Measured parameter signal processing for both valve control and temperature are effected in similar fashions. The measured parameter signals are filtered by, respectively, the analogue input filter 530 and the thermocouple input filter 532. All measured parameter input signals are provided as differential pairs and the analogue versions of the signals are selected by multiplexers under control of the select control signals AIN SEL and TC SEL decoded from the data bus outputs of digital signal processor 506. Analogue input signal selection is accomplished by analogue multiplexer 534 in response to the selection control signals AIN SEL and thermocouple input signal selection is accomplished by analogue multiplexer 536 in response to the selection control signals. TC SEL. The selected differential pair signals are amplified by, respectively, differential amplifiers 538 and 540. The resulting analogue input signals are input to analogue multiplexer 542 where a single analogue signal is selected in response to the selection control signals A/D SEL for application to analogue-to-digital converter 546. Selected analogue signals are buffered and clamped by amplifier circuitry 545 prior to application to analogue to digital converter 546 to protect the analogue to digital converter from excessive input signal magnitudes.

To obtain maximum resolution of a digital representation of velocity of the injection ram without resort to a physical velocity transducer, the analogue position signal is differentiated in its analogue form by analogue differentiate circuitry 548. The output of the analogue differentiate circuitry 548 is input to analogue multiplexer 542 for selection and conversion by analogue-to-digital converter 546. It will be recognized by those skilled in the art that a digital representation of the injection ram velocity can be obtained by digital means from the position signal. However, at low ram velocities, the magnitude of position change at the valve control loop closure rate may be so small as to be unsuitable for use of conventional digital techniques. The analogue differentiate circuitry 548 is provided with a time constant to accommodate the lowest contemplated velocities of the injection ram.

In applicant's preferred embodiment, temperature sensing is performed by thermocouples located, for example within barrel segment 40 proximate heater bands 46 through 54. Additional thermocouples may be used to measure temperature at nozzle 44 and temperature of hydraulic fluid within pump and tank unit 22. To accommodate the effective thermocouple junctions created by connections of the thermocouple leads to signal processing module 104' a cold junction temperature sensing thermistor 550 is mounted on signal processing module 104 and incorporated in a voltage dividing network driven by a precision voltage source. The thermistor voltage, representing temperature induced changes of the thermistor resistance is applied as an input to analogue multiplexer 542.

Input signal processing is completed by conversion of the analogue representations to digital representations at the controlling loop closure interval in response to the conversion control signal A/D CONV decoded from the data bus output of digital signal processor 506. Analogue-to-digital converter 546 incorporates a sample and hold circuit which effects sampling of the selected analogue input signal in response to the conversion control signal The resulting digital representations of the input signals are read by digital signal processor 506 and periodically written to dual port memory 504 for access by processor module 110.

Analogue command signals are produced by digital-to-analogue converter 522 controlled by a data write signal DACWR decoded from the data bus outputs of digital signal processor 506. Data to be written to digital-to-analogue converter 552 is derived from local bus 514 and buffered by the data bus buffers 554. Applicant has provided for up to four analogue output signals and signal selection is performed at analogue demultiplexer 556. In an alternative embodiment, a single analogue output is used and the multiplexer output is effectively bypassed. The output of digital to analogue converter 552 is applied to analogue output amplifiers 558 which include holding capacitors where the selected analogue output signals are stored between outputs of the digital-to-analogue converter 552 As applied to the injection molding machine of FIG. 1, the amplified analogue output signals are applied to hydraulic valves, such as proportional valve 170 shown in FIG. 2 for controlling, for example, clamp mechanism actuator 34. As noted, up to four analogue output signals may be produced by signal processing module 104, providing control signals for up to four proportional valves each controlling, for example, a single mechanism actuator. Alternatively, a single proportional valve may be used in combination with directional valves to control plural mechanism actuators. In a first alternative embodiment, the analogue output commands define valve spool position and are applied to hydraulic valves equipped with power amplifiers including valve spool position and valve current control circuitry. In a second alternative embodiment, the analogue output commands represent valve current control signals derived from valve spool position commands, measured valve spool positions, and measured valve current. In this embodiment, additional analogue input interfaces are provided for measured valve position signals produced by, for example, position transducers such as linear variable differential transformer (LVDT) 171 shown in FIG. 2, and the like, and measured valve current signals produced by, for example, current sensing shunt resistors such as resistor 172 shown in FIG. 2, and the like.

In addition to servo control, signal processor 104 provides control signals for eight devices operated in response to binary or ON/OFF signals such as, for example, the heater bands 46 through 54. The binary device control signals are applied to DC output interface circuitry 528 which includes over-current protection circuitry. While applicant's preferred embodiment includes DC output interfaces. AC output interfaces intended for binary operation might be substituted therefore. Two binary control signals are decoded from data bus outputs of digital signal processor 506 and an additional six binary control signals are produced directly at outputs of digital signal processor 506.

Operation of Signal Processor Module

Procedures executed by digital signal processor 506 to effect valve control and temperature control shall be described with reference to FIGS. 4a through 4c, and 5a through 5c. Control is effected by three primary procedures, background processing associated with communication with processor module 110; valve control loop processing; and, temperature control loop processing. Valve control loop processing and temperature control loop processing are effected in response to respective loop closure interrupt signals derived from the loop closure interval timing signals. Digital signal processor 506 continuously performs background processing until the occurrence of a loop closure interrupt signal.

Figure 4A:
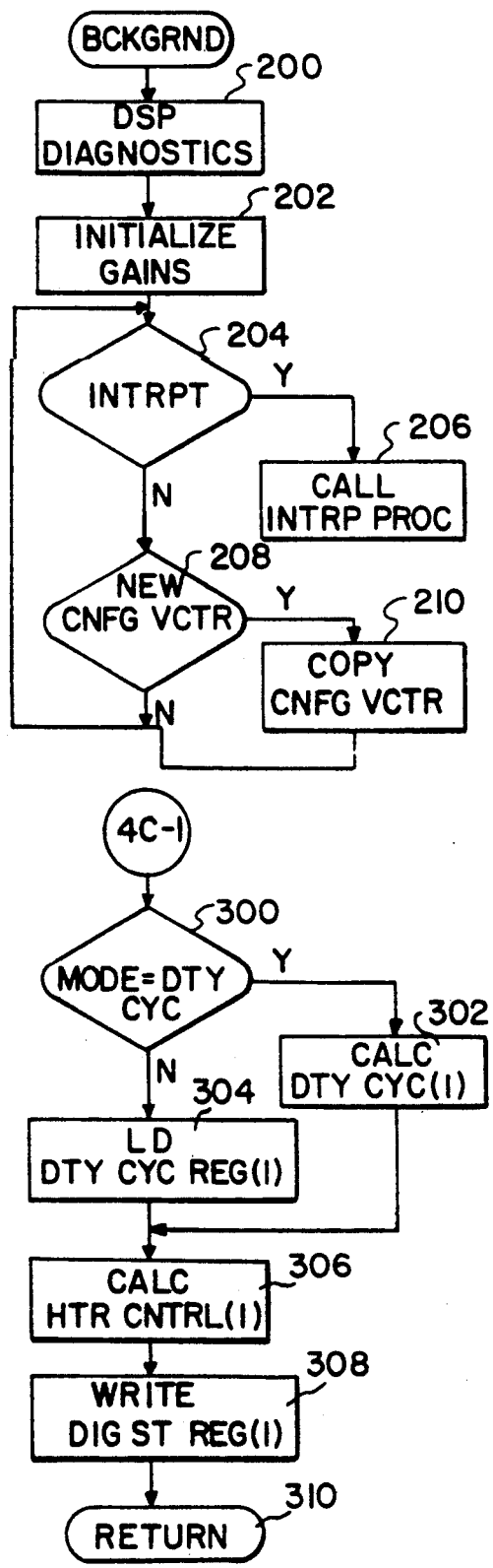
FIGS. 4a, 4b and 4c are flow charts of the primary procedures executed by the processor of the servo control of FIG. 3.

Background processing is illustrated by the flow chart of FIG. 4a. With initial application of power to signal processing module 104, diagnostic routines are executed at process step 200 to verify the correct functioning of the module components. In the event a failure is detected, a failure output is set in dual port memory 504 for access by processor module 110 Upon successful completion of the diagnostic routines, execution of power-up initialization routines is performed at process step 202. Initialization includes setting output commands to initial values pending the first execution of control algorithms. Following execution of diagnostic and initialization routines, continuous processing of background routines is effected. Decision step 204 is shown in FIG. 4a for the purpose of conveniently indicating continuous execution of the background routines until occurrence of either of the loop closure interrupt signals. Upon occurrence of a loop closure interrupt, execution of the appropriate interrupt routines is initiated by process step 206.

Communication between signal processing module 104 and processor module 110 effected by background processing is accomplished with multiple word vectors including: (a) an analogue configuration vector providing gain constants for valve control algorithms, ramp function constants and analogue processing mode commands; and. (b) a digital configuration vector providing gain constants for temperature control algorithms and temperature loop processing mode commands Communication between signal processing module 104 and processor module 110 effected with each loop closure includes two additional multiple word vectors: (a) an input register vector providing digital representations of analogue inputs and measured temperatures; and. (b) an output register vector providing servo control setpoint values for valve control and temperature control and commands for binary outputs. Until the occurrence of a loop closure interrupt, a register value in dual port memory 504 is interrogated to determine whether or not configuration vector data has been written by processor module 110. Detection of the presence of configuration vector data is determined by decision step 208 and at process step 210, the configuration vector data is copied to reserved locations in dual port memory 504 and a status flag is set indicating digital configuration data has been received. Thereafter, the background processing loop is continued as illustrated by the line returning to decision step 204.

Valve Control Processing

Valve control processing shall be described with reference to FIGS. 4b and 5a through 5c. Valve control loop processing occurs at a loop closure interval of 500 microseconds. The flow chart of FIG. 4b illustrates the procedure executed by digital signal processor 506 for each occurrence of the valve control loop closure interrupt signal. To enable diagnostics to be performed by the processor module 110, loop processing may be disabled by commands contained in the valve control configuration vector. At decision step 220, it is determined whether or not loop processing is enabled, and if not, the analogue to digital converter output commands are set equal to null values at process step 222 and output through digital to analogue converter 552 at process step 221. At process step 223 the DC outputs are set equal to zero and background processing is resumed via the return through terminal 245.

If it is determined at decision step 220 that valve control loop processing is enabled, execution of the flow chart of FIG. 4b continues at process step 224 where the binary control signals received from processor module 110 are output to DC output interface 528. At process step 226, the analogue input signals are converted to digital representations by analogue-to-digital converter 546. At process step 228, the digital representations of the measured parameters are scaled to account for offsets and limits affecting the analogue representations. It is the purpose of the scaling function to adjust the digital representations to extend over the full available digital range. At process step 230, the digital representations of the measured parameters are written to dual port memory 504 for access by processor module 110.

Three modes of processing associated with valve control loops are provided: i.e.. null mode in which the analogue output commands are set equal to zero; program mode in which the analogue output commands are set equal to values included with the output register vector data; and, control mode in which the analogue output command values are calculated according to a control algorithm. At decision step 232, it is determined whether the null mode has been programmed. If the null mode has been programmed, the analogue output commands are set equal to zero or any appropriate null value at process step 234. Process steps 236 through 240 are skipped as indicated by the flow control line returning to the flow chart mainline following process step 240. Assuming that the null mode has not been programmed, decision step 236 detects whether the program mode has been set true by the configuration vector. If so, the analogue output commands are set equal to set point values at process step 238 and process step 240 is skipped. If it is determined at decision step 236 that the program mode is not set active, execution continues at process step 240 where the analogue output commands are calculated according to associated control algorithms as will be more completely described hereinafter.

Following execution of process steps 234 238, and 240, execution of the flow chart of FIG. 4b continues through process steps 250 through 244 to produce control signals according to two alternative embodiments. In a first alternative embodiment analogue output commands are produced for direct application to a control valve incorporating valve current control. In this embodiment, the analogue output commands produced through steps 234. 238, and 240 are output through digital to analogue converter 552 at process step 250. Thereafter the analogue output command values are written to the output vector locations of dual port memory 504 for access by processor module 110 at process step 242. In a second alternative embodiment valve current control is effected by digital signal processor 506 and step 250 is skipped. Further processing is performed following step 242 to produce valve control signals. At process step 260 the valve current control signal values are calculated. At process step 262, the current control signals are output through digital to analogue converter 552. At process step 264, the current command and current control signals are written to dual port memory 504 for access by processor module 110. Thereafter background processing is resumed through the return of terminal 244.

Figure 4C:
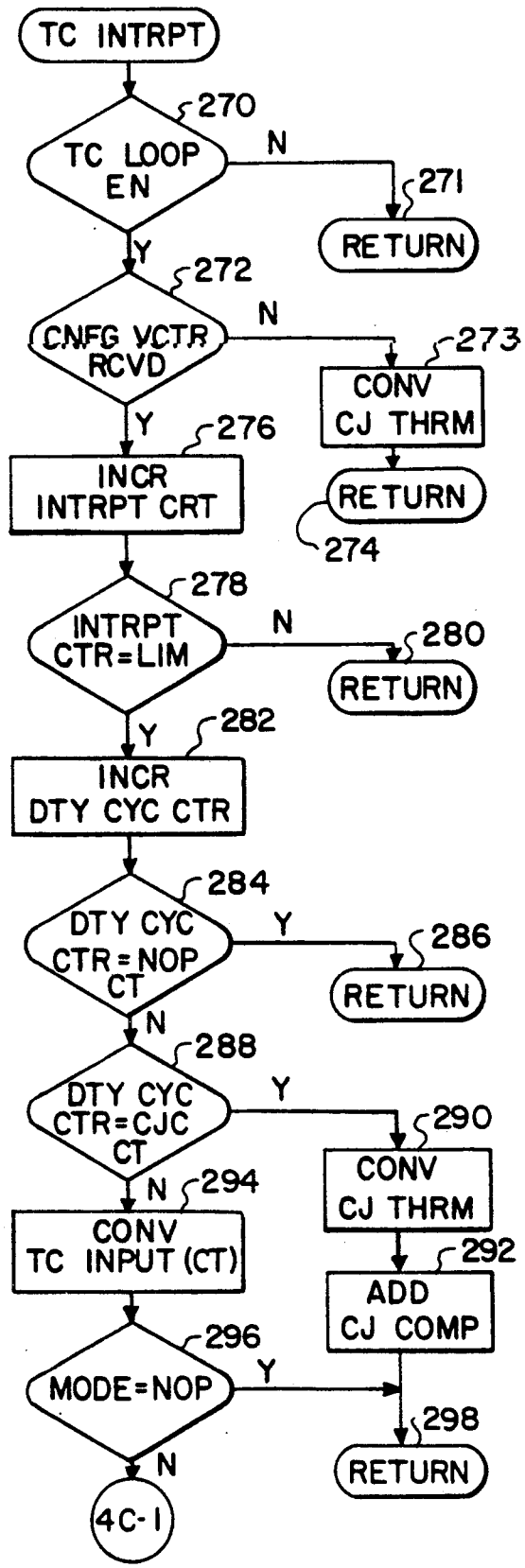
Figure 4B:
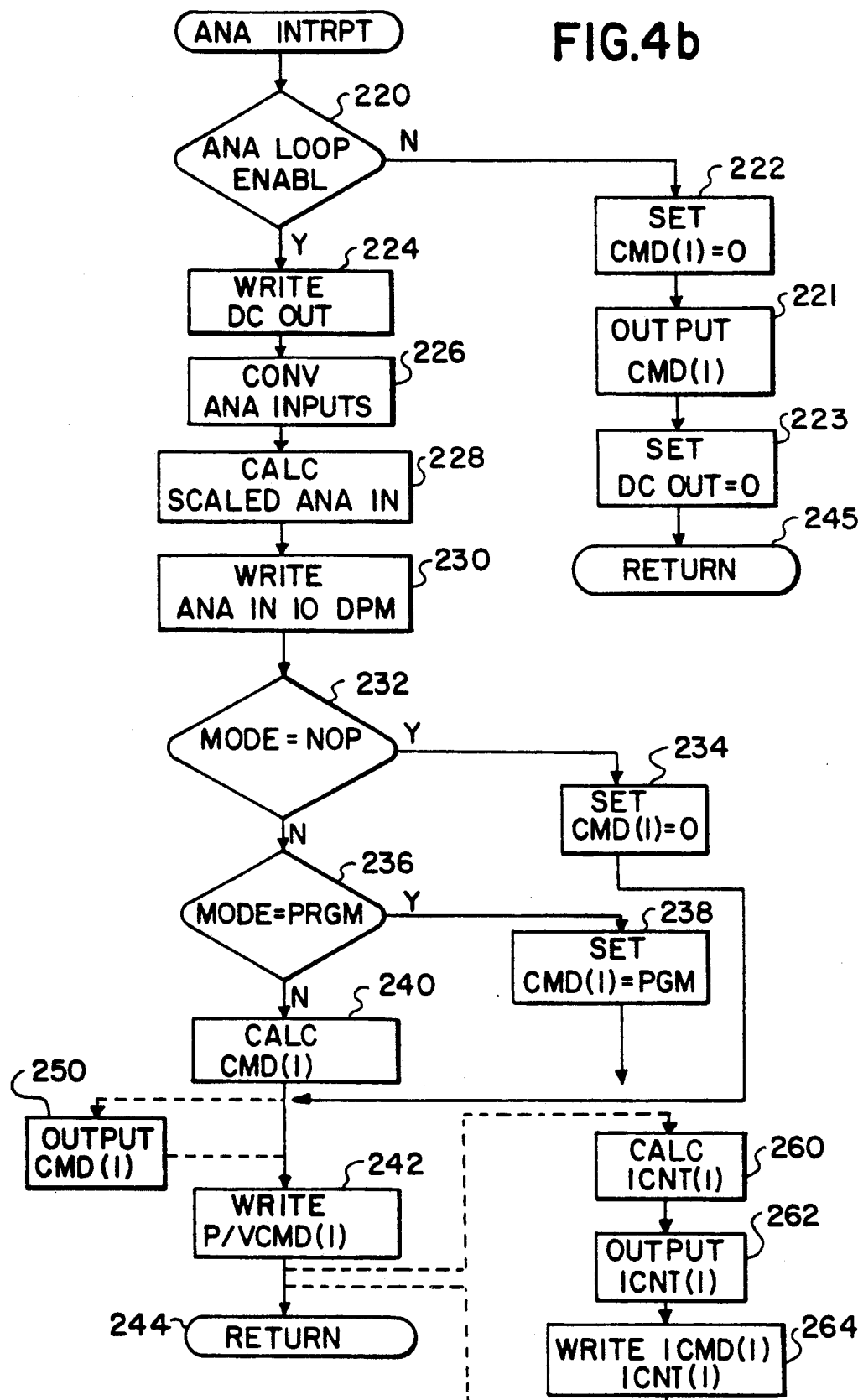
Figure 5A:
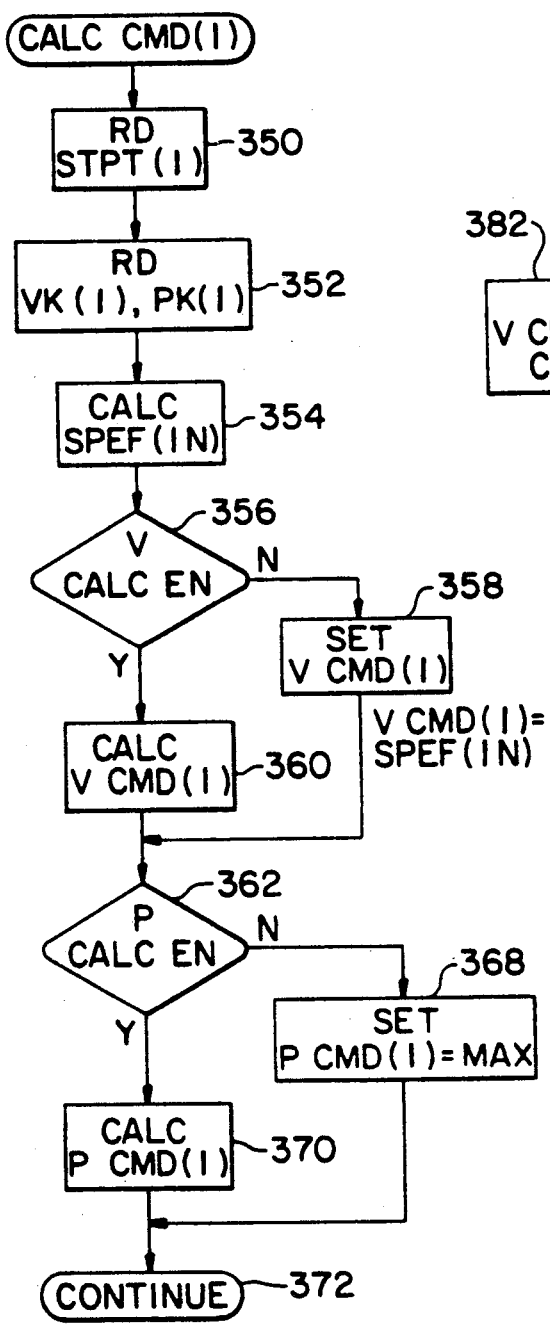
FIG. 5a, 5b, and 5c are flow charts illustrating procedures associated with the flow chart of FIG. 4b.

A detailed description of the procedure for calculating the analogue output commands associated with process step 240 of the flow chart of FIG. 4b shall be made with reference to the flow chart of FIG. 5a. At process step 350, the program set points for pressure and velocity are read from the output register vector locations of dual port memory into local memory of digital signal processor 506. At process step 352, control algorithm gains are read from the dual port memory 504 into local memory of digital signal processor 506. At process step 354, the set point values read from dual port memory 504 are adjusted according to predetermined transition functions to accomplish gradual changes between programmed values. In particular, changes in velocity commands are effected in accordance with predetermined acceleration and deceleration functions and changes in pressure commands are effected in accordance with predetermined ramp functions. The general form of the acceleration, deceleration, and ramp functions is as follows:

$$SPEF_N = SPEF_{N-1} + (STPT - SPEF_{N-1}) * K_R$$

Where:
SPEF = effective set-point
STPT = programmed set-point
$K_R$ = gain of the ramp function
N = iteration index To accommodate position based switching of set point values as is used in connection with control of the clamp mechanism of the injection molding machine, further set point adjustment is provided to effect ramping of set point values to the transition positions. The algorithm for position based ramping is as follows:

$$SPEF_N = STPT_2 + K_{PR} * ((ACTPOS_N - POS_2)_{abs})^{1*} (STPT_1 - STPT_2)$$

Where:
$SPEF_1$ = effective set-point
$STPT_1$ = set-point programmed up to transition position
$STPT_2$ = set-point programmed from transition position
$POS_2$ = transition position
$()_{abs}$ = absolute value of the enclosed expression
ACTPOS = measured position
N = iteration index As applied to clamp mechanism 12, ACTPOS is derived from potentiometer 161.

Continuing with reference to FIG. 5a, at decision step 356, it is determined whether or not a velocity control algorithm has been enabled for the output command identified by index I. If not, the analogue output command value CMD is set equal to the effective velocity set point value at process step 358. If it is determined at decision step 356 that velocity control algorithm calculation is enabled, execution continues at process step 360 where a velocity command value is calculated in accordance with the following:

$$VCMD_{IN} = VCMD_{K(N-2)} + VK_1 * E_N + VK_2 * E_{(N-1)} + VK_3 * E_{(N-2)}$$

Where:
VCMD = velocity output command defining a valve position

E=servo error. i.e. difference of $VSPEF_{IN}$ and $VFDBK_{IN}$

Where:
VSPEF=effective velocity set-point
VFDBK=measured velocity
I=loop selection index
$VK_1$=first velocity loop gain
$VK_2$=second velocity loop gain
$VK_3$=third velocity loop gain
N=iteration index And the gains $VK_1$, $VK_2$, and $VK_3$ are related to proportional $VK_p$, integral $VK_i$, and derivative $VK_d$ gains according to the following:

$$VK_1 = VK_p + 2VK_d/T + VK_iT/2$$

$$VK_2 = VK_iT - 4VK_d/T$$

$$VK_3 = VK_iT/2 + 2VK_d/T - VK_p$$

where
T=time of the loop closure interval

Continuing with reference to the flow chart of FIG. 5a. it is determined at decision step 362 whether or not a pressure control algorithm calculation has been enabled. If not, the pressure command is set to a maximum value at process step 368. If it is determined at decision step 362 that the pressure loop control algorithm calculation is enabled, a pressure command $PCMD_I$ is calculated at process step 370. Thereafter, execution of the valve control interrupt routine is continued through terminal 372. Pressure command calculation is performed according to the following:

$$PCMD_{IN} = PCMD_{I(N-2)} + PK_1{}^*E_N + PK_2{}^*E_{(N-1)} + PK_3{}^*E_{(N-2)}$$

Figure 5B:
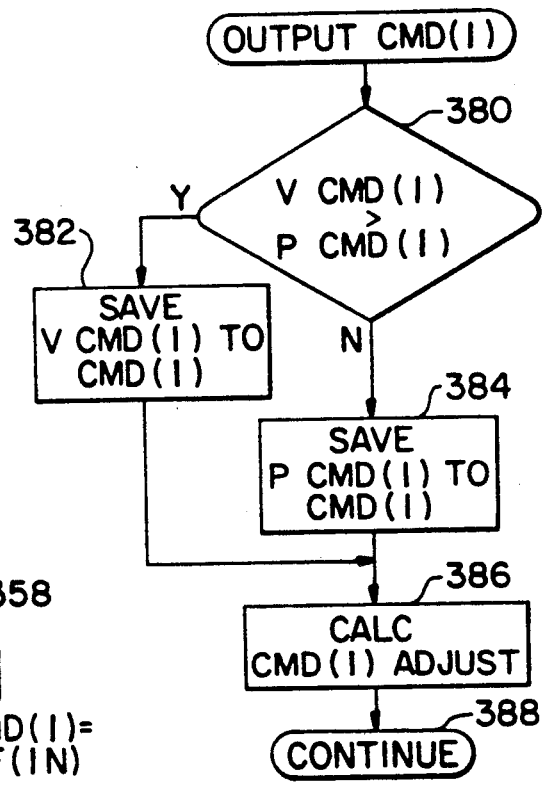

Where:
PCMD=pressure output command defining a valve position
E=servo error, i.e. difference of $PSPEF_{IN}$ and $PFDBK_{IN}$ Where:
PSPEF=effective pressure set point
PFDBK=measured pressure
I=loop selection index
$PK_1$=first pressure loop gain
$PK_2$=second pressure loop gain
$PK_3$=third pressure loop gain
N=iteration index And the gains $PK_1$, $PK_2$, and $PK_3$ are related to proportional $PK_p$, integral $PK_i$, and derivative PKs gains as described with reference to the velocity loop algorithm calculation The procedure for outputting valve position commands associated with process step 250 of the flow chart of FIG. 4b, is illustrated in detail by the flow chart of FIG. 5b. At decision step 380 the larger of the velocity command VCMD value and pressure command $PCMD_I$ value is determined. If the velocity command $VCMD_I$ defines a relatively more closed position of the valve to be controlled, the velocity command value is saved for ultimate output to the control valve. If it is determined at decision step 380 that the pressure command PCMD defines a more closed position of the control valve, the pressure command value is saved as a command value at process step 384. It will be recalled that if pressure command calculation has not been enabled for the active loop, the pressure command PCMD is set to maximum insuring that velocity control is effected. At process step 386 the saved command value is adjusted to define a magnitude no lesser or greater than predetermined minimum and maximum values. The effect of the comparison and selection routine of the flow chart of FIG. 5b is to perform pressure relief during velocity control using an adjustable pressure set point. Thereafter, execution of the valve control algorithm is continued through terminal 388.

Figure 5C:
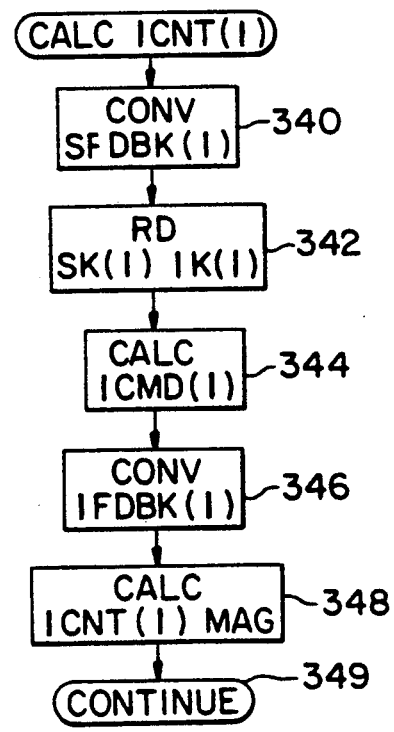

A detailed description of the procedure associated with process step 260 for producing current control signals associated with the alternative embodiment providing valve current control shall be had with reference to the flow chart of FIG. 5c. At process step 340 the measured valve position signals are converted from the analogue representation to the digital representation. At process step 342 the valve control loop gains are read from dual port memory into local memory of digital signal processor 506. At process step 344 valve current command values are calculated in accordance with the following control algorithm:

$$ICMD_{IN} = ICMD_{I(N-2)} + SK_1{}^*E_N + SK_2{}^*E_{(N-1)} + SK_3{}^*E_{(N-2)}$$

Where:
ICMD=current output command defining a valve current
E=servo error, i.e. difference of $CMD_{IN}$ and $SFDBK_{IN}$ Where:
CMD=valve position command
SFDBK=measured valve position
I=loop selection index
$SK_1$=first position loop gain
$SK_2$=second position loop gain
$SK_3$=third position loop gain
N=iteration index And the gains $SK_1$, $SK_2$, and $SK_3$ are related to proportional $SK_p$, integral $SK_i$, and derivative $SK_d$ gains as described with reference to the velocity loop algorithm calculation. As applied to control of valve 170 of FIG. 2, measured valve spool position SFDBK is derived from LVDT 171.

Continuing with reference to FIG. 5c, at process step 346 the measured valve current signals are converted from the analogue representation to a digital representation by the analogue-to-digital converter 546. At process step 348 the current control signal values are calculated in accordance with a current control algorithm having the following form:

$$ICNT_{IN} = ICNT_{I(N-2)} + IK_1{}^*E_N + IK_2{}^*E_{(N-1)} + IK_3{}^*E_{(N-2)}$$

Where:
ICNT=current output signal
E=servo error, i.e, difference of $ICMD_{IN}$ and $IFDBK_{IN}$ servo error, i.e, difference of ICMDs and Where:
ICMD=valve current command
IFDBK=measured valve current
I=loop selection index
$IK_1$=first current loop gain
$IK_2$=second current loop gain
$IK_3$=third current loop gain N = iteration index And the gains IK$_1$, IK$_2$, and IK$_3$ are related to proportional IK$_p$, integral IK$_i$, and derivative IK$_d$ gains as described with reference to the velocity loop algorithm calculation. As applied to control of valve 170 of FIG. 2, measured valve current IFDBK is derived from shunt resistor 172. Thereafter, processing of the valve control procedure is continued through terminal 349.

Temperature Control Processing

Digital signal processor 506 executes temperature control algorithms at a temperature control loop closure interval of 50 milliseconds. Processing is provided for up to 8 temperature control loops producing control signals for controlling the duty cycle of application of power to, for example, barrel heaters 46 through 54. The duty cycle period is programmable, and the effective duty cycle within the programmable period is programmable in 5% increments. The duty cycle period is defined by data programmed with the digital configuration vector. Calculation of duty cycle command values are performed in accordance with PID control algorithms relating measured temperature, a temperature set point and plant parameters as represented by loop algorithm gain constants. As previously stated, measured temperature is derived from thermocouples and compensation for the effective thermocouples created by connection of the thermocouple leads to signal processing module 104 is performed for each thermocouple input. This compensation is referred to hereinafter as "cold junction compensation".

A description of the temperature control procedure executed by digital signal processor 506 shall be made with reference to the flow chart of FIG. 4c. As with the case of the valve control procedure, temperature control processing may be disabled by processor module 110 by commands supplied with the configuration vector. At decision step 270, it is determined whether or not temperature control loop processing has been enabled. If it has not, background processing is resumed via the return of terminal 271. If temperature control loop processing has been enabled, execution continues at process step 272 where it is determined whether or not the status flag is set indicating digital configuration vector has been written to dual port memory 504. If no configuration vector has been written, temperature control loop processing will not be performed. Rather, the cold junction compensation thermistor value is converted by analogue to digital converter 546 at process step 273 and background processing is resumed through the return of terminal 274.

Continuing with reference to FIG. 4c, and assuming that temperature control loop processing has been enabled and digital configuration vector has been written, execution continues at process step 276 where an interrupt counter used for controlling the rate of loop processing is incremented. At decision step 278 it is determined whether or not the interrupt counter is equal to a predetermined limit required to achieve temperature control loop processing within the duty cycle period. If it is determined at decision step 278 that the interrupt counter is not equal to this limit value, execution of the background processing is resumed via the return through terminal 280.

A single duty cycle counter is used to effect duty cycle control for all eight temperature control outputs. At process step 282, the duty cycle counter is incremented once each time the interrupt has been incremented to the programmed limit value. The duty cycle counter is used secondarily to control selection of the heater control signal processing to be executed with each execution of the temperature control procedure. It will be appreciated that to achieve 5% increments of duty cycle, the duty cycle counter will have a greater number of states than are required to select data for 8 temperature control signals. At decision step 284, it is determined whether or not the current value of the duty cycle counter is equal to a value for which no temperature control processing is required. If so, execution of the background processing is resumed via the return of terminal 286.

Assuming that the duty cycle counter value is not equal to a no operation value, execution of the flow chart of FIG. 4c continues at decision step 288. There it is determined whether or not the duty cycle counter value corresponds to a value assigned for performing cold junction compensation processing. If not, processing of a selected temperature control procedure is affected At process step 294, a selected thermocouple input is converted. At decision step 296, it is determined whether or not the programmed mode of temperature control processing has been set equal to a no operation condition by processor module 110. If it has, execution of background processing continues via the return through terminal 298.

Assuming that processor module 110 has not called for null mode of temperature control processing, execution of the flow chart of FIG. 4c continues at decision step 300 where it is determined whether or not a heater control value is to be calculated. If so, execution continues at process step 302 where a new value for the duty cycle is calculated in response to the measured temperature in accordance with the following algorithm:

$$DCMD_{IN} = DCMD_{I(N-2)} + NK_1{}^*E_N + HK_2{}^*E_{(N-1)} + HK_3{}^*E_{(N-2)}$$

Where:
DCMD = duty cycle command
E = servo error, i.e. difference of TSPEF$_{IN}$ and TFDBK$_{IN}$ Where:
TSPEF = temperature effective set point
TFDBK = measured temperature
I = loop selection index
HK$_1$ = first heating loop gain
HK$_2$ = second heating loop gain
HK$_3$ = third heating loop gain
N = iteration index And the gains HK$_1$, HK$_2$, and HK$_3$ are related to proportional HK$_p$, integral HK$_i$, and derivative HK$_d$ gains as described with reference to the velocity loop algorithm calculation.

Following calculation of the duty cycle command value DCMD$_I$, the value for the heater control signal is calculated at process step 306. The heater control signal defines whether or not power is to be applied to the associated heater band during the next temperature control loop closure interval. The effective duty cycle command value is combined with the current value of the interrupt counter to produce the required state of the control signal. At process step 308 the calculated value is written to dual port memory 504 for access by processor module 110. Thereafter, execution of background processing is resumed via the return through terminal 310.

If it is determined at decision step 300 that the duty cycle calculation is not to be performed, process step 302 would be skipped, and a duty cycle value would be loaded directly to a duty cycle register in the local memory of digital signal processor 506. Thereafter, the heater control signal would be calculated at process step 306 as previously described. The contents of the duty cycle register may be used by processor module 110 to produce binary control signals through, for example, DC output interface 102 or the DC output interface circuits 528 on signal processing module 104. Cold Junction compensation for the effective thermocouple junction at the connection of thermocouple leads to the signal processing module 104 is reserved for a single state of the duty cycle counter. If it is determined at decision step 288 that the duty cycle counter is equal to the state for effecting cold junction compensation, execution of the procedure of the flow chart of FIG. 4c continues at process step 290 where the analogue representation of the cold junction thermistor 550 is converted to a digital representation by the analogue-to-digital converter 546. At process step 292, the cold junction temperature value is added to the selected measured temperature value. Thereafter, execution of the flow chart of FIG. 4c continues at decision step 296 as previously described.

DC Output Interface

It will be recalled that binary control signals are output to the DC output interface circuit at process step 224 shown in FIG. 4b. While the ultimate control of the binary output interfaces is determined by the application program 160 executed by processor 110, applicant has provided sufficient load current capacity in these circuits to operate, for example, switching devices for applying power to the heater bands 46 through 54. It will be recognized that the binary output interfaces may be used in connection with other machine devices suitable for control through the signal processing module 104. In any case it is desirable to provide over-current protection for these output interface circuits to prevent damage to circuit components.

Figure 6:
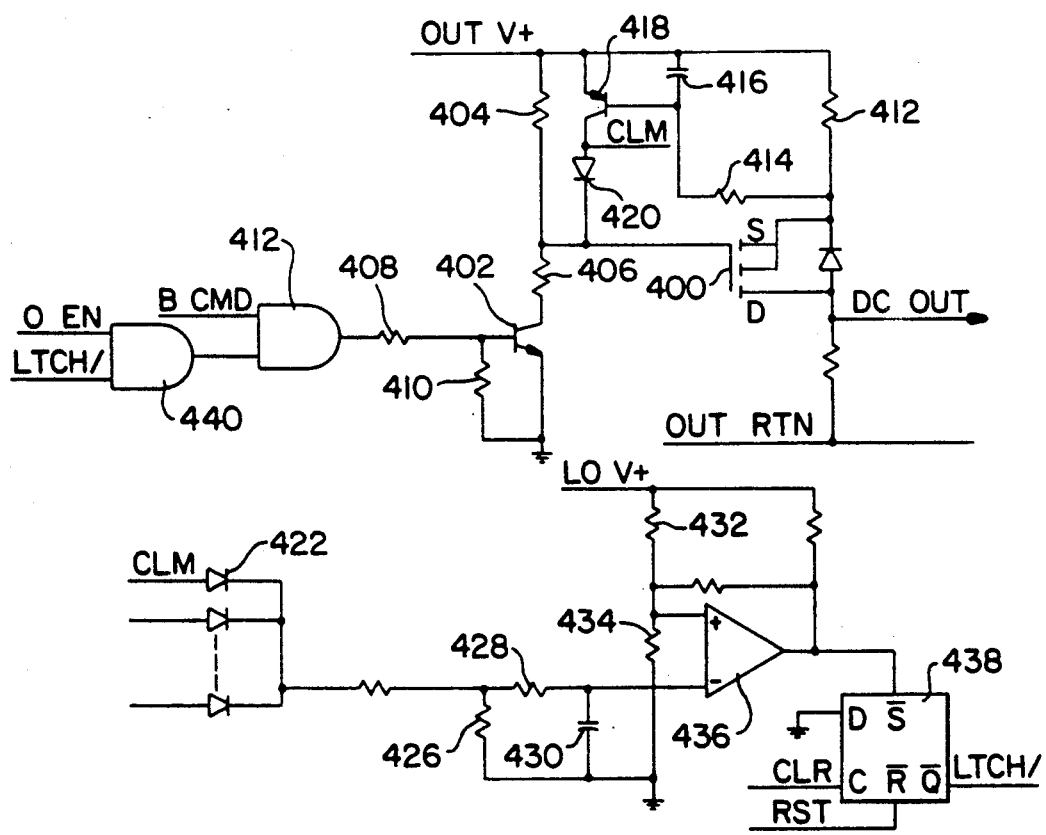
FIG. 6 is a circuit diagram of a DC output interface circuit including over-current protection.

An exemplary binary output interface circuit including over, current protection circuitry shall be described with reference to FIG. 6. Output drive transistor 400 is an MOS field effect transistor. Switching of output transistor 400 is controlled by a gate control signal produced by drive transistor 402 which, in normal operation, is switched on and off in response to a DC output command decoded from digital signal processor 506. Resistors 408 and 410 provide a voltage dividing network at the output of AND gate 412 to create a forward bias voltage for the base-emitter junction of drive transistor 402. With drive transistor 402 conducting, resistors 404 and 406 form a voltage divider to develop the gate bias voltage required for output transistor 400 to conduct.

Two stage over-current protection is provided to prevent output transistor 400 from conducting potentially damaging current levels. First, short term current limiting is provided to respond to momentary over-current conditions by temporarily switching output transistor 400 out of saturation. Current limiting is controlled by the load current measured by current sensing resistor 412 connected between the output supply voltage and the source terminal of output transistor 400. The current sensing resistor voltage is coupled to the base of current limiting transistor 418 by current limiting resistor 414. Capacitor 416 introduces delay in the response of current limiting transistor 418 to prevent oscillation from feedback of the load current signal. As load current reaches a predetermined limit, the voltage appearing across current sensing resistor 412 will become sufficient to forward bias the base-emitter junction of transistor 418 bringing transistor 418 into conduction. Current limiting transistor 418 is operated linearly to increase the voltage at the gate of output transistor 400, bringing output transistor 400 out of saturation, thus limiting the current conducted thereby.

The second stage of over-current protection effectively monitors the time of current limiting effected by current limiting transistor 418 and produces a latched inhibit signal for all DC output interface circuits in response to sensing a prolonged over-current condition. The conducting condition of current limiting transistor 418 is coupled to an over-current latch circuit through input diode 422. Current limiting output signals for each of the DC output interface circuits are similarly applied to the input diodes of the over-current latch circuit and are effectively OR'd by the connection of the input diodes. Resistors 424 and 426 serve as voltage dividers to produce a voltage for charging a capacitive timing network created by resistor 428 and capacitor 430. The time constant of the network of resistor 428 and capacitor 430 provides a predetermined period of current limiting before disabling the outputs. If the over-current limiting period is sufficiently long, capacitor 430 is charged to a bias voltage in excess of a predetermined reference. This condition is detected at comparator 436 where a reference is provided by the voltage divider formed by resistors 432 and 434. If it is determined at comparator 436 that the current limiting period capacitor has been charged to the reference voltage, the output of comparator 436 sets the flip flop 438 to produce a latched output disable signal which is applied to gate circuits at the input of each of the DC output interface circuits. The latch signal appears as an input at AND gate 440. With flip flop 438 set, drive transistor 402 is biased out of conduction and is not enabled to be switched on until flip flop 438 has been reset by application of a reset signal decoded from the outputs of signal processor 506.

It will be appreciated that the technique of two stage over-current protection described in the preferred embodiment may be applied using alternative components to perform current limiting and time based latching. Nor should the technique be considered limited in its application to MOS FET power transistors, as the same techniques may be as readily adapted to use with bipolar power transistors.

What is claimed is:

1. An apparatus for servo-control of injection molding machine devices including machine mechanisms and heaters, the machine having transducers for producing measured parameter signals representing measured temperatures and measured values of selected machine conditions, the apparatus producing device control signals in response to command input signals, representing set point values defining desired operation of the devices, the apparatus comprising:
   a. means for periodically sampling measured parameter signals representing mechanism conditions at a first predetermined loop closure interval and periodically sampling measured condition signals representing temperature at a second loop closure interval; and b. a processor responsive to the command input signals and the sampled values of the measured parameter signals for periodically executing analogue loop algorithms relating first selected set point values, the first predetermined loop closure interval and the mechanism condition values to produce mechanism control signals at the first loop closure interval and periodically executing temperature loop algorithms relating second selected set point values, the second loop closure interval and the measured temperatures to produce heater control signals at the second loop closure interval.

2. The apparatus of claim 1 wherein the mechanisms are controlled by electrically operated hydraulic valves and the processor executes an analogue loop algorithm for each valve relating a set point value and a measured value to produce a valve position command; executes a valve position loop algorithm for each valve relating a valve position command value and measured valve position to produce a valve current command value, and executes a current loop algorithm for each valve relating a valve current command value and measured valve current to produce a valve control value represented by the associated mechanism control signal.

3. The apparatus of claim 1 wherein the mechanisms are controlled by electrically operated hydraulic valves and the processor executes an analogue loop algorithm for each valve relating a set point value and a measured value to produce a valve position command defining a magnitude of valve closure represented by the associated mechanism control signal.

4. The apparatus of claim 3 further comprising valve driver interface circuits for applying the mechanism control signals to the valves.

5. The apparatus of claim 3 wherein the machine includes a clamp mechanism operating a movable platen to which is mounted a die component and a first transducer for measuring the actual position of the movable platen and the processor executes a clamp velocity loop algorithm relating the rate of change of measured position of the movable platen and a set point velocity to produce a control signal for controlling the velocity of the movable platen.

6. The apparatus of claim 5 wherein the processor executes a ramp function to modify the set point velocity to effect a velocity change at a predetermined location of the movable platen.

7. The apparatus of claim 3 wherein the machine includes an injection ram for forcing material to be molded into a mold cavity and a first transducer for measuring the actual position of the injection ram and a second transducer for measuring hydraulic pressure applied to inject the material and the processor executes: i) an injection velocity loop algorithm relating a rate of change of measured position of the injection ram and an injection velocity set point to produce a first desired injection control valve position command value; and, ii) an injection pressure loop algorithm relating measured injection pressure and an injection pressure set point to produce a second desired injection control valve position command value; and the processor combines the first and second desired injection control valve position command values to produce an injection ram control signal.

8. The apparatus of claim 7 further comprising an analogue differentiator operating on measured values of the injection ram position to determine the rate of change of injection ram position.

9. The apparatus of claim 3 wherein the machine includes an extruder for plasticizing material to be injection molded and a first transducer for measuring actual extruder angular velocity and the processor executes an extruder velocity loop control algorithm relating extruder set point velocity and measured extruder angular velocity to produce an extruder control signal.

10. The apparatus of claim 1 wherein the processor executes a heat control algorithm relating measured temperature and a temperature set point to produce a duty cycle command value defining a duty cycle of energization of a heater to be effective during a programmable duty cycle period.

11. The apparatus of claim 10 wherein the temperature measuring transducers are thermocouples mounted on the machine and the apparatus further comprises cold junction compensation means for compensating the measured temperature for the effects of connection of the thermocouples to the sampling means.

12. The apparatus of claim 1 wherein the apparatus further comprises DC interface circuits for applying binary control signals to selected machine devices.

13. The apparatus of claim 12 wherein the DC interface circuits include over-current protection comprising:
   a. current limiting circuitry for limiting the current delivered by the interface circuit to a load;
   b. means for monitoring the duration of current limiting; and
   c. means responsive to the monitoring means for disabling the output of the interface circuit when the period of current limiting exceeds a predetermined limit.

14. A method for servo control of an injection molding machine mechanism control valve, the machine having transducers for producing measured parameter signals representing measured values of selected machine conditions, a desired operation of the controlled mechanism being defined by set point signals representing set point values of machine operation parameters, the method comprising the steps of:
   a. periodically sampling measured parameter signals representing mechanism conditions at a predetermined loop closure interval to produce analogue input signals;
   b. producing during the loop closure interval a first command value in response to a first selected analogue input signal, a first set point signal, and a predetermined algorithm relating the first set point value and a first measured parameter value affected by operation of the controlled mechanism;
   c. producing during the loop closure interval a second command value in response to a second selected analogue input signal, a second set point signal and a second predetermined algorithm relating the second set point value and a second measured parameter value affected by operation of the controlled mechanism;
   d. comparing the first command value to the second command value to determine the larger value;
   e. selecting a command value in response to the comparison; and,
   f. producing a valve control signal in response to the selected command value.

15. The method of claim 14 wherein the first selected analogue input signal represents a velocity effected by operation of the controlled device and the first predetermined algorithm relates a velocity set point value and the measured velocity value.

16. The method of claim 15 wherein the second selected analogue input signal represents hydraulic pressure applied through the controlled valve and the second predetermined algorithm relates a pressure set point value and the measured hydraulic pressure.

17. A method for servo control of injection molding machine devices including machine mechanisms and heaters, the machine having transducers for producing measured parameter signals representing measured temperatures and values of selected machine conditions, the devices being controlled in response to control signals produced in response to set point signals representing set point values defining desired operation of the devices, the method comprising the steps of:
   a. periodically producing first interrupt signals defining a first predetermined loop closure interval;
   b. periodically producing second interrupt signals defining a second predetermined loop closure interval;
   c. sampling measured parameter signals representing mechanism conditions at the first predetermined loop closure interval;
   d. sampling measured condition signals representing temperature at the second loop closure interval;
   e. executing analogue loop algorithms relating first selected parameter values, first selected set point values, the first predetermined loop closure interval and the mechanism condition values to produce mechanism control signals at the first loop closure interval; and,
   f. executing control temperature loop algorithms relating second selected parameter values, second selected set point values, the second predetermined loop closure interval and the measured temperatures to produce heater control signals at the second loop closure interval.

18. The method of claim 17 wherein the mechanisms are controlled by electrically operated hydraulic valves and the step of producing mechanism control signals further comprises the steps of:
   a. executing a loop algorithm for each valve relating a set point value and a measured value to produce a valve position command defining a magnitude of valve closure;
   b. executing a valve position loop algorithm for each valve relating a valve position command value and measured valve position to produce a valve current value; and.
   c. executing a current loop algorithm for each valve relating a valve current command value and measured valve current to produce a valve control value represented by the associated mechanism control signal.

19. The method of claim 17 wherein the mechanisms are controlled by electrically operated hydraulic valves and the step of producing mechanism control signals further comprises executing a loop algorithm for each valve relating a set point value and a measured value to produce a valve position command defining a magnitude of valve closure represented by the associated mechanism control signal.

20. The method of claim 19 wherein the machine includes a position transducer for measuring the actual position of a machine component and a pressure transducer for measuring hydraulic pressure applied to a related mechanism actuator and the step of producing a mechanism control signal further comprises:
   a. executing a velocity loop algorithm relating a rate of change of measured position of the machine component and a velocity set point to produce a first desired control valve position command value;
   b. executing a pressure loop algorithm relating measured pressure and a pressure set point to produce a second desired control valve position command value; and,
   c. combining the first and second desired control valve position command values to produce a mechanism control signal.

21. The method of claim 20 wherein the step of combining the first and second control valve position command values further comprises:
   a. comparing the first and second control valve position command values to determine the larger; and,
   b. selecting the control valve position command value in response to the comparison.

22. The method of claim 19 wherein the machine includes a clamp mechanism operating a movable platen to which is mounted a die component and a first transducer for measuring the actual position of the movable platen and the step of producing a mechanism control signal for the clamp mechanism further comprises the step of executing a clamp velocity loop algorithm relating the rate of change of measured position of the movable platen and a set point velocity to produce a mechanism control signal for controlling the velocity of the movable platen.

23. The method of claim 22 wherein the step of producing a mechanism control signal further comprises executing a ramp function to modify the set point velocity to effect a velocity change at a predetermined location of the movable platen.

24. The method of claim 19 wherein the machine includes an injection ram for forcing material to be molded into a mold cavity and a first transducer for measuring the actual position of the injection ram and a second transducer for measuring hydraulic pressure applied to inject the material and the step of producing a mechanism control signal further comprises:
   a. executing an injection velocity loop algorithm relating a rate of change of measured position of the injection ram and an injection velocity set point to produce a first desired injection control valve position command value;
   b. executing a pressure loop algorithm relating measured injection pressure and an injection pressure set point to produce a second desired injection control valve position command value; and,
   c. combining the first and second desired injection control valve position command values to produce the control signal.

25. The method of claim 17 wherein the step of producing heater control signals further comprises the step of executing a heat control algorithm relating measured temperature and a temperature set point to produce a duty cycle command value defining a duty cycle of energization of a heater during a programmable duty cycle period.

26. A method for servo control of an injection molding machine mechanism control valve, the machine having transducers for producing measured parameter signals representing measured values of selected machine conditions, a desired operation of the controlled mechanism being defined by set point signals representing set point values of machine operation parameters, the method comprising the steps of:
  a. periodically sampling measured parameter signals representing mechanism conditions at a predetermined loop closure interval to produce analogue input signals;
  b. producing, at the predetermined loop closure interval, a command value in response to a selected analogue input signal, a set point signal, and a predetermined algorithm relating the set point value and a measured parameter value affected by operation of the controlled mechanism;
  c. producing, at the predetermined loop closure interval, a valve current value in response to executing a valve position loop algorithm relating the command value, the predetermined loop interval and a measured valve position; and,
  d. producing, at the predetermined loop closure interval, a valve control signal in response to executing a current loop algorithm relating the valve current command value, the predetermined loop closure interval and a measured valve current.

27. The method of claim 26 wherein the step of producing a command value further comprises the steps of:
  a. producing a first command value in response to a first selected analogue input signal, a first set point signal, and a first predetermined algorithm relating the first set point value and a first measured parameter value affected by operation of the controlled mechanism;
  b. producing a second command value in response to a second selected analogue input signal, a second set point signal and a second predetermined algorithm relating the second set point value and a second measured parameter value affected by operation of the controlled mechanism;
  c. comparing the first and second command values; and
  d. selecting one of the first command value and the second command value in response to the comparison.

28. The method of claim 27 wherein the first selected analogue input signal represents a velocity effected by operation of the controlled device and the first predetermined algorithm relates a velocity set point value and the measured velocity value.

29. The method of claim 28 wherein the second selected analogue input signal represents a pressure affected by operation of the control valve and the second predetermined algorithm relates a pressure set point value and the measured pressure value.

* * * * *